Figure 2:
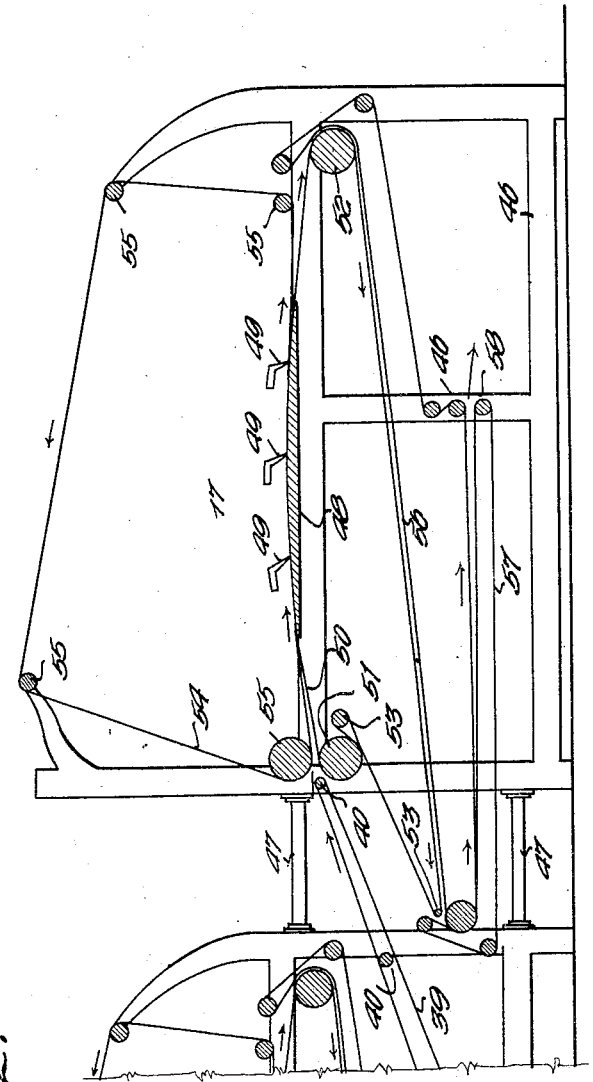

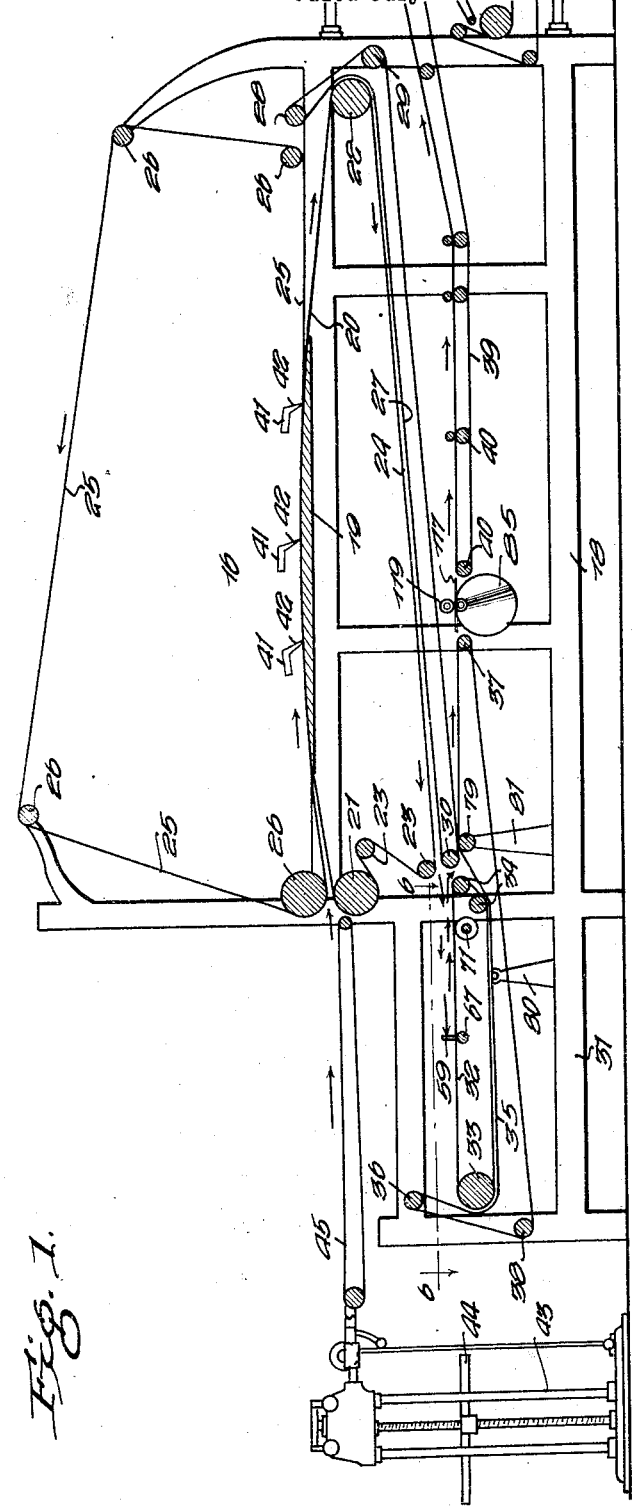

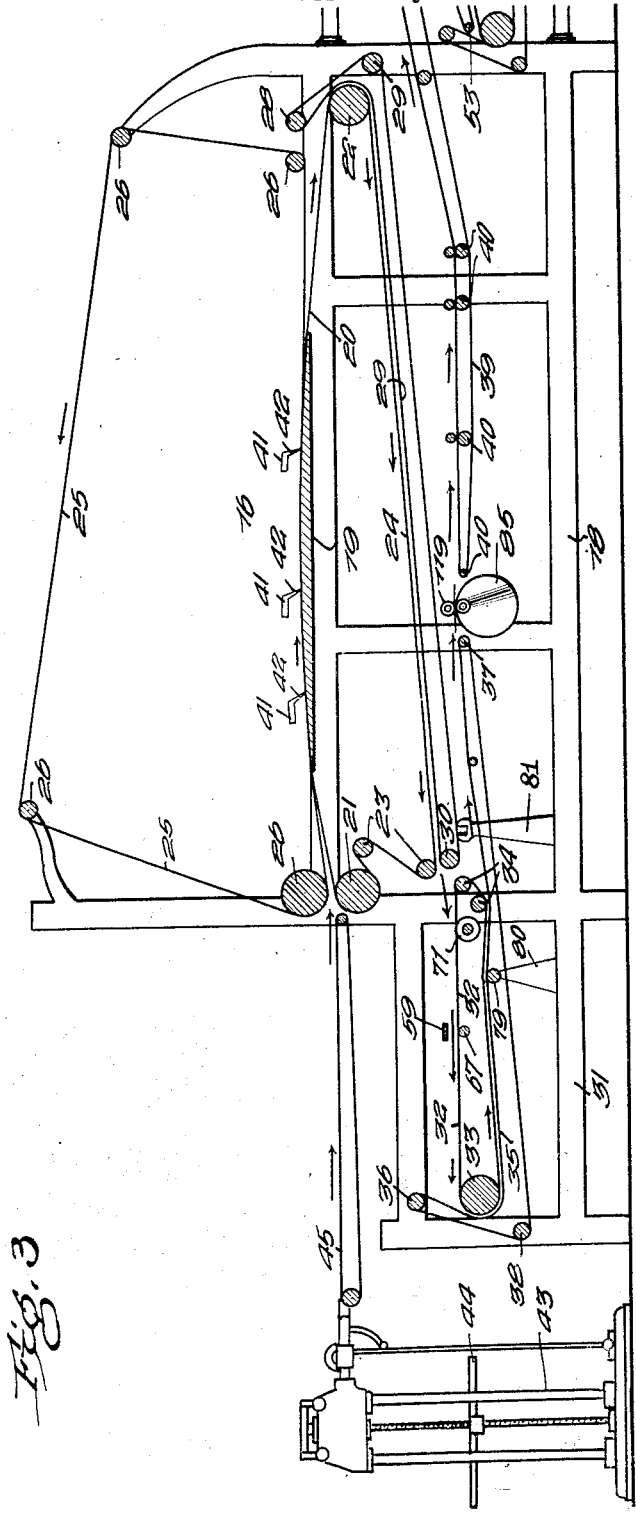

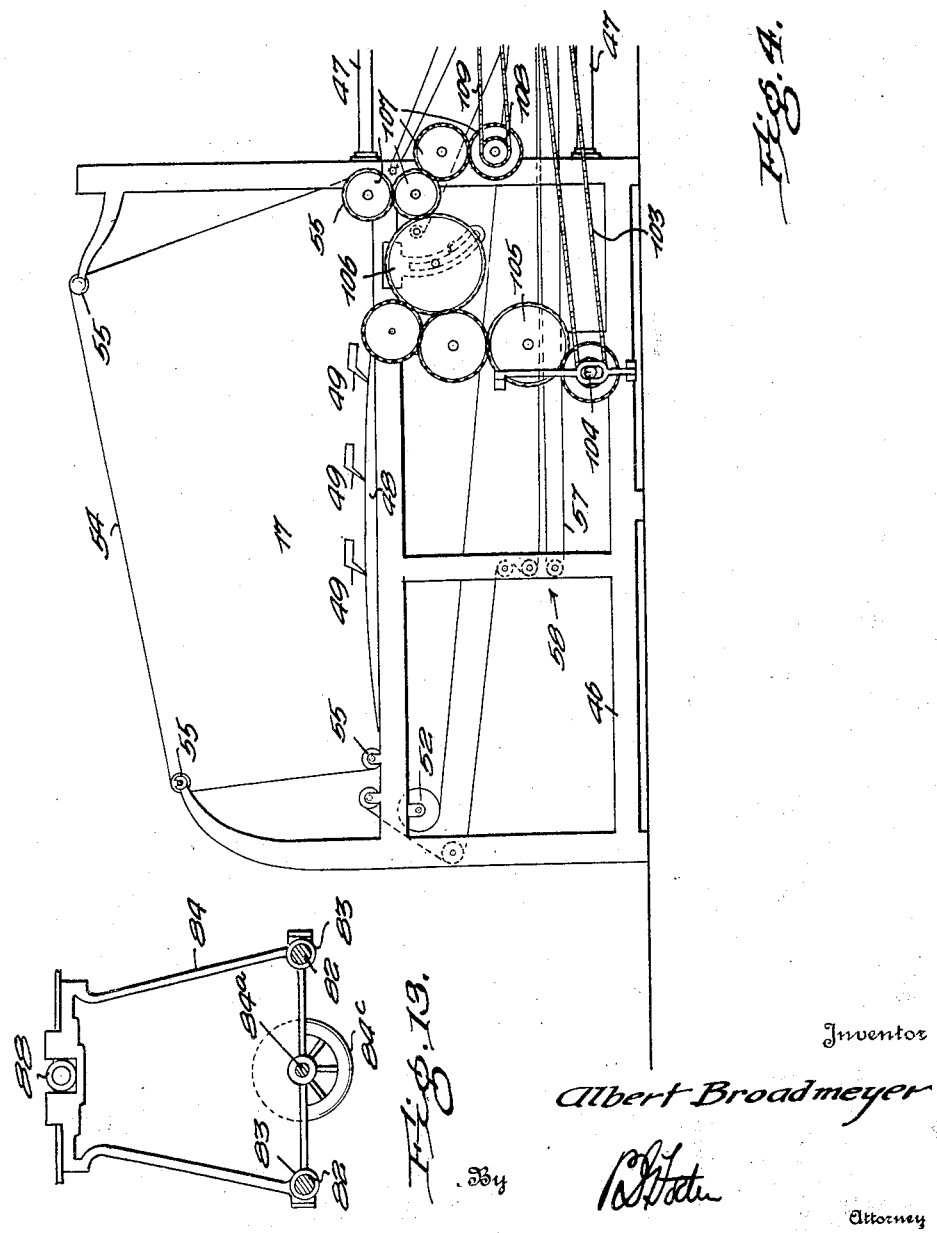

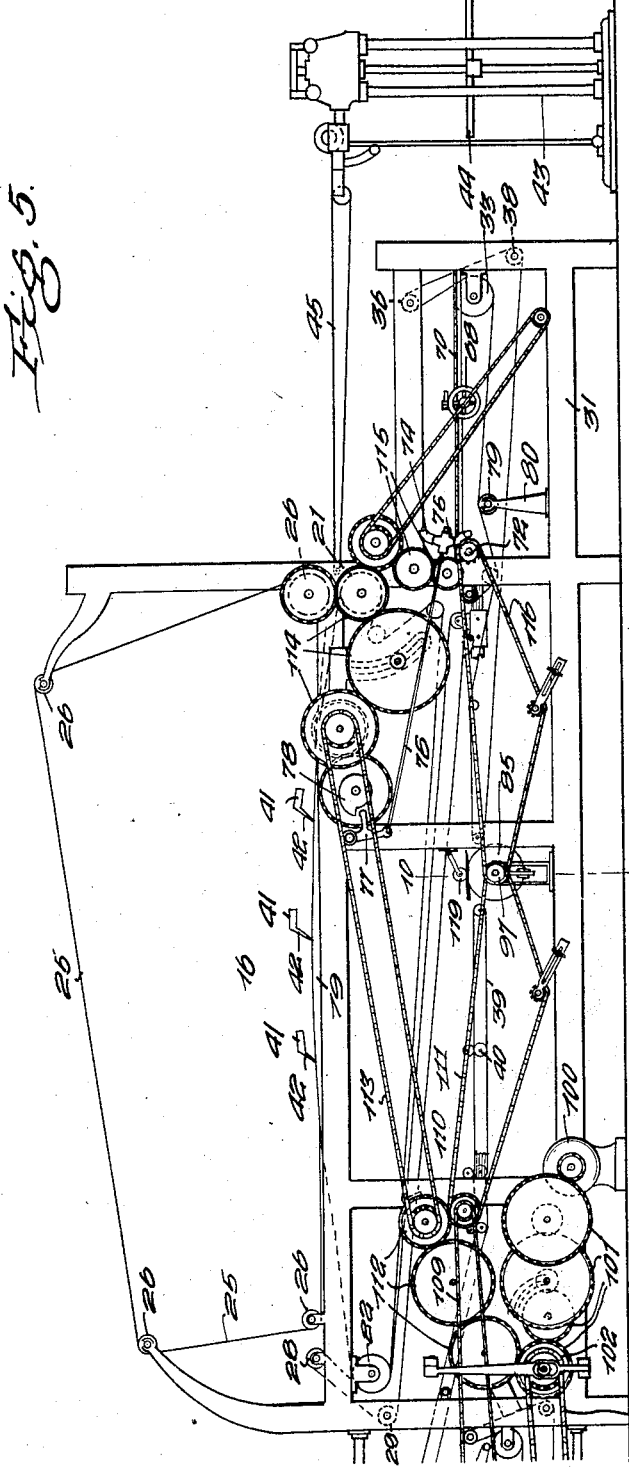

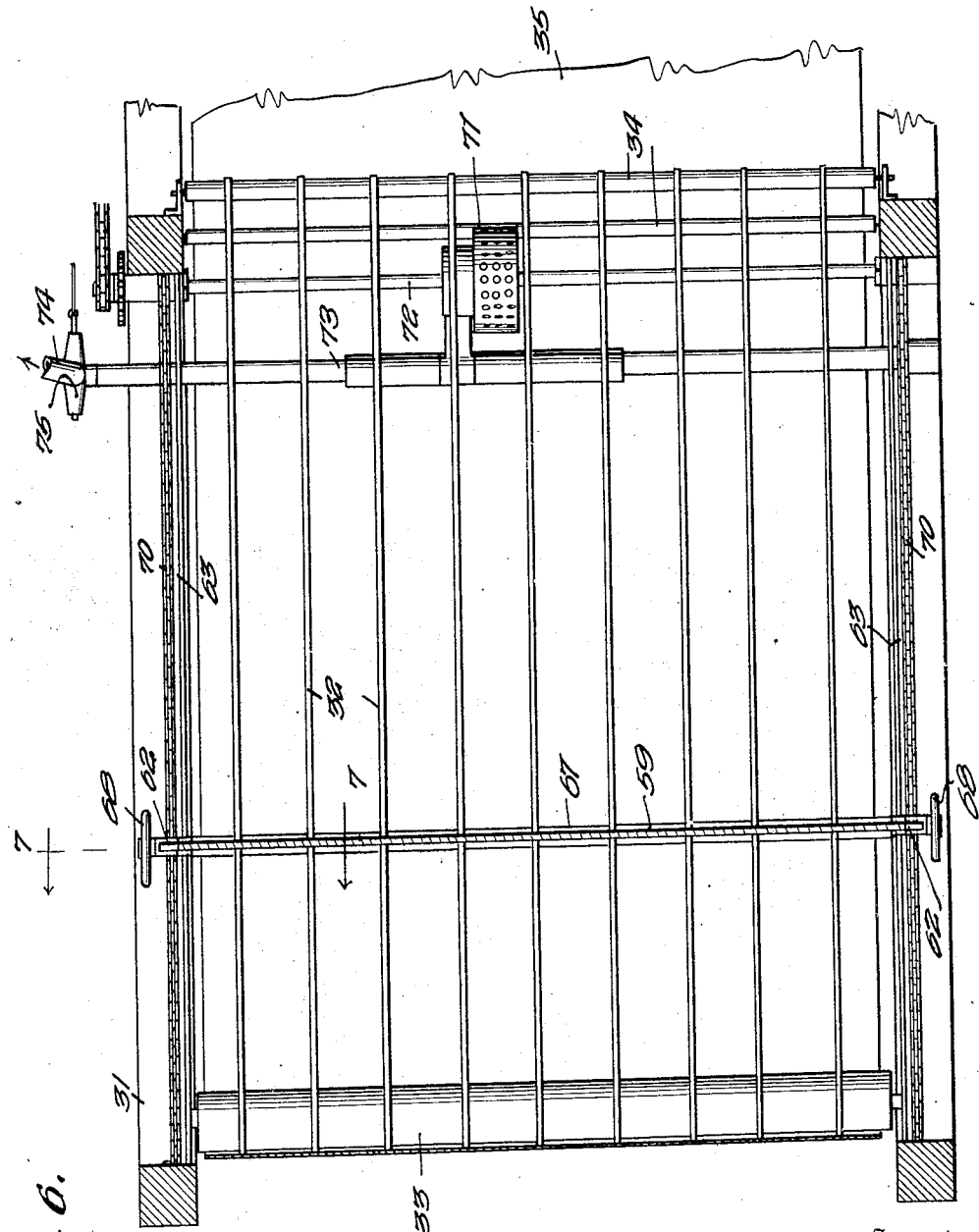

Feb. 21, 1928.
A. BROADMEYER
RULING MACHINE
Filed July 2, 1925
1,660,116
9 Sheets-Sheet 7
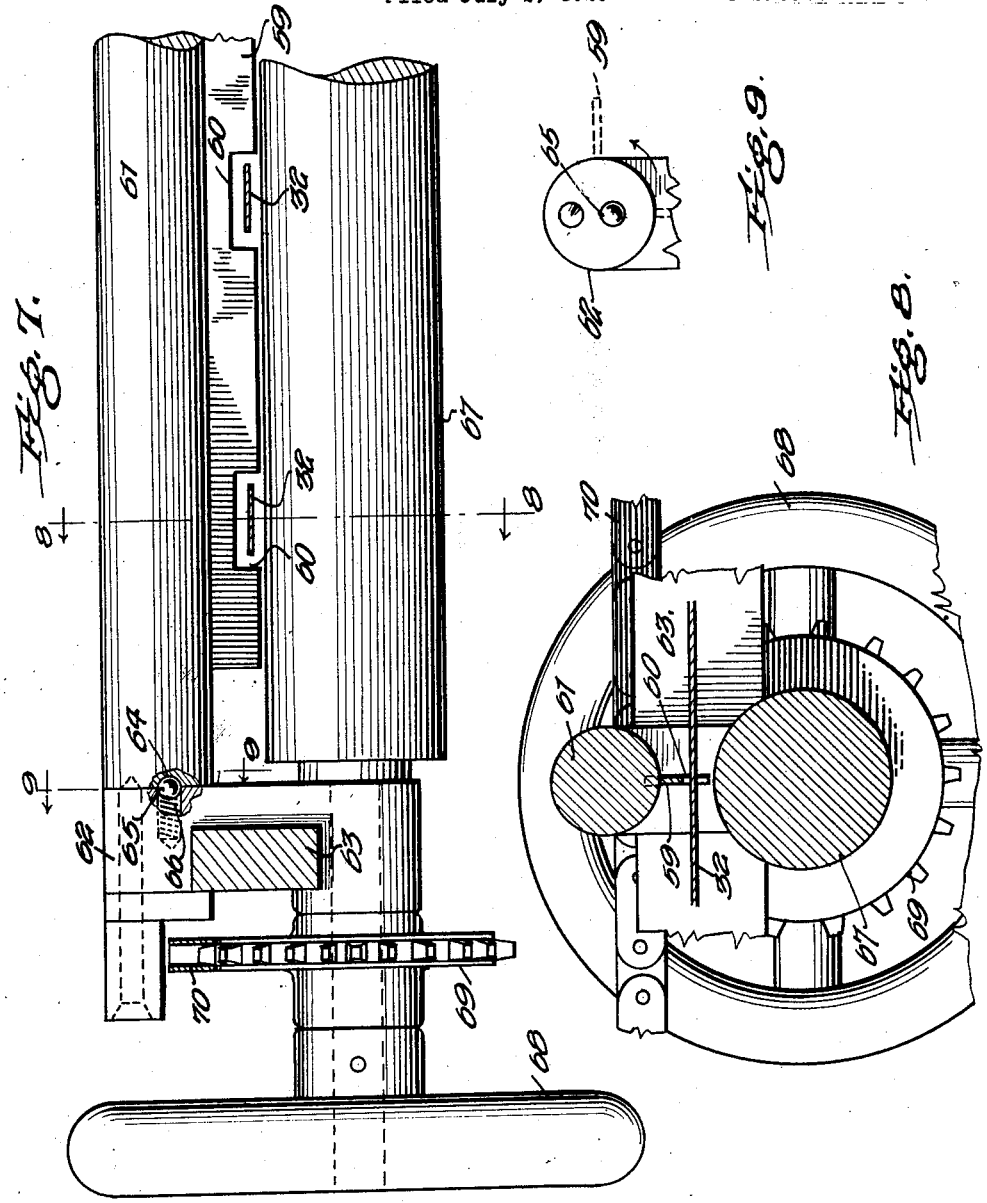
Inventor
Albert Broadmeyer
By
Attorney

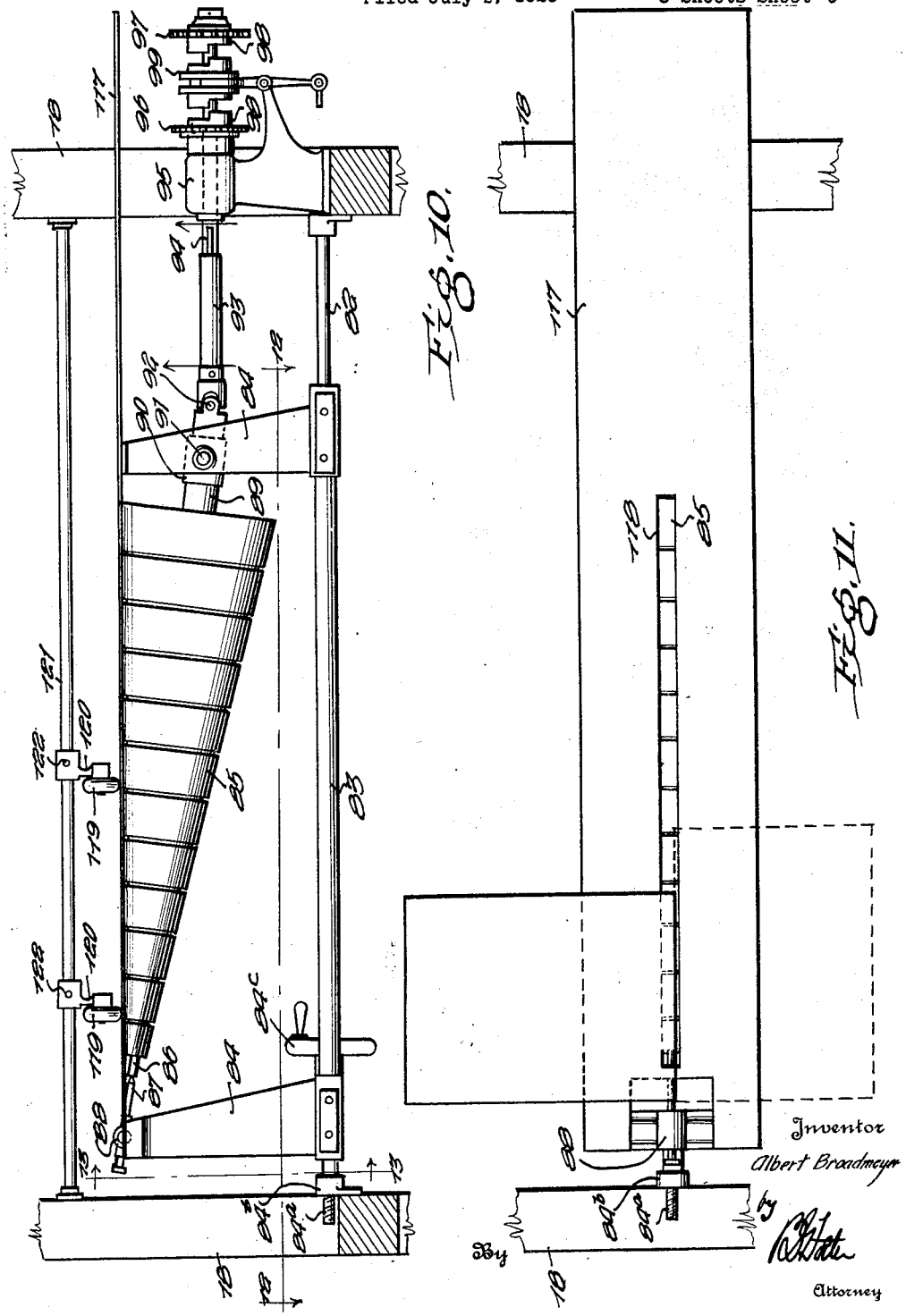

Feb. 21, 1928.  
A. BROADMEYER  
1,660,116  
RULING MACHINE  
Filed July 2, 1925  
9 Sheets-Sheet 9
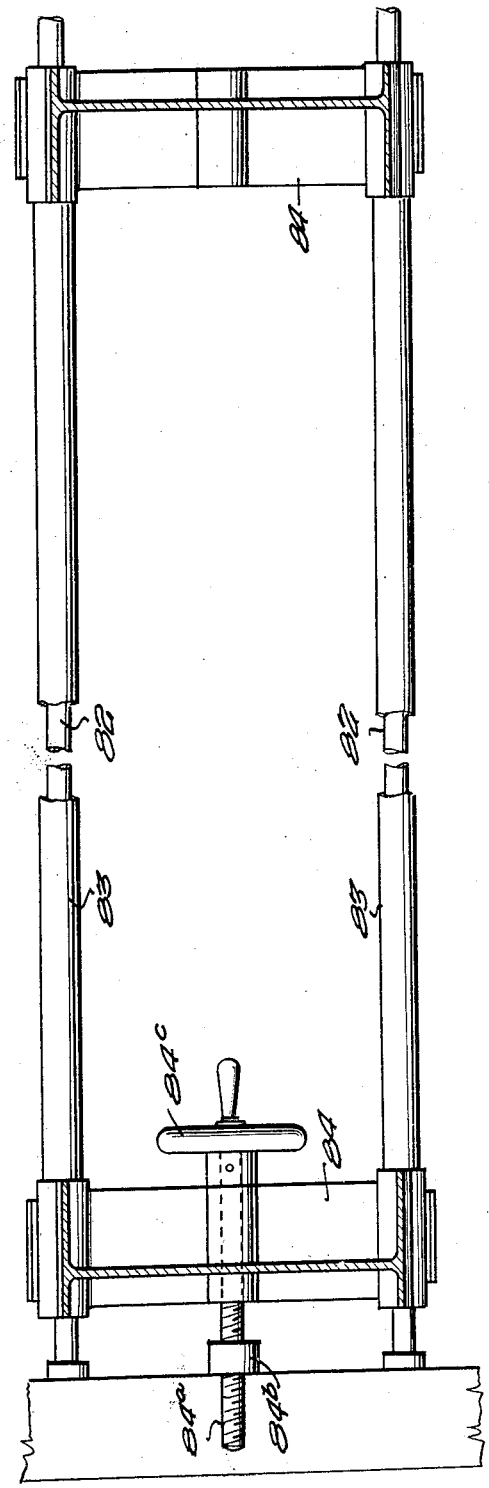
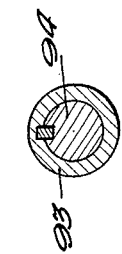
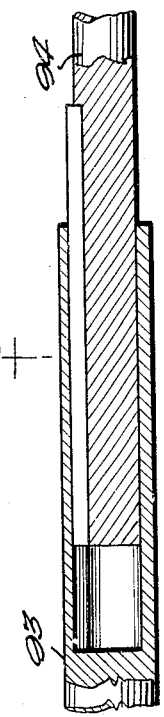
Inventor  
Albert Broadmeyer  
By  
Attorney Patented Feb. 21, 1928.

1,660,116

UNITED STATES PATENT OFFICE.

ALBERT BROADMEYER, OF HARRISBURG, PENNSYLVANIA, ASSIGNOR TO W. O. HICKOK MFG. COMPANY, OF HARRISBURG, PENNSYLVANIA, A CORPORATION OF PENNSYLVANIA.

RULING MACHINE.

Application filed July 2, 1925. Serial No. 41,163.

The present invention relates to ruling machines, and one of the principal objects is to provide novel and practicable apparatus, by means of which the lines may be ruled on either or both faces of a sheet, and also the sheet may be ruled both ways, or in other words, intersecting lines may be ruled thereon.

A further and important object is to provide a machine of this character that is relatively compact, so that it will not occupy an overly great amount of floor space, and at the same time the various instrumentalities are readily available by an operator on the floor, thus eliminating the necessity of elevated mechanism that is difficult to reach and manipulate.

In the accompanying drawings:—

Figures 1 and 2 constitute a vertical longitudinal sectional view through a preferred embodiment of the invention, showing the mechanism operating to reverse the sheets so as to rule opposite faces of the same, Figure 3 is a vertical longitudinal sectional view through the portion of the machine illustrated in Figure 1, but illustrating the mechanism operating to always rule the same side of the sheet.

Figures 4 and 5 together illustrate an elevation of the rear side of the machine, and illustrating more particularly the driving mechanism therefor, Figure 6 is a plan view of the sheet reversing mechanism and is a horizontal sectional view taken on the line 6—6 of Figure 1, Figure 7 is a detail sectional view on the line 7—7 of Figure 6, Figure 8 is a detail sectional view on the line 8—8 of Figure 7, Figure 9 is a detail sectional view of the holding device for the gate and is taken on the line 9—9 of Figure 7, Figure 10 is a cross sectional view through the machine taken substantially on the line 10—10 of Figure 5, and illustrating in elevation the sheet turning mechanism, Figure 11 is a top plan view of the same, Figure 12 is a plan view of the supporting frame for the sheet turning mechanism, illustrated in Figure 10, and is taken on the line 12—12 of Figure 10, Figure 13 is a sectional view taken on the line 13—13 of Figure 10, Figure 14 is a detail sectional view through the drive shaft for the sheet turning cone, Figure 15 is a sectional view on the line 15—15 of Figure 14.

The machine taken as a whole may be considered to involve two sets of ruling instrumentalities that may be of any desired or well-known character. One of these is designated generally by the reference numeral 16, and the other by the reference numeral 17.

The instrumentality 16 includes a suitable frame 18, having a bed 19, over which the upper stretch 20 of an endless conveyor cloth or belt operates. This conveyor passes around a suitable roller 21 at the front end of the frame and about a roller 22 at the rear end of said frame. It also passes around suitable guide or idler rollers 23. The conveyor thus has a lower stretch 24. Cooperating with the upper stretch 20 are the usual endless cords 25 passing about suitable guide rollers 26, all of which is well-known to the art. Cooperating with the underside of the lower stretch 24 of the conveyor are the upper stretches of endless cords 27 that pass around the rear roller 22, about an upper guide roller 28, a lower rear guide roller 29, and a front guide roller 30. As shown the cords 27 are spaced from the belt 24, but it will be understood that the views are diagrammatic in order to illustrate the different elements and that they are in close association with the belt.

It will be noted that the frame 18 has an extension 31 at its front end, which is somewhat lower than the main portion of said frame, and in this extension are located a set of horizontally disposed endless tapes 32, passing around a front roller 33 and around a pair of guide rollers 34 at their rear ends. These guide rollers are located in juxtaposition to the rollers 23 and 30. Cooperating with the under stretches of the tapes 32 is the upper stretch 35 of an endless conveyor belt or cloth that passes around an upper guide roller 36, thence downwardly around the roller 33, upwardly around the lower roller 34, about a guide roller 37, beneath the cords 27, thence forwardly around a guide roller 38 on the front end of the frame extension 31. A suitable endless conveyor 39, mounted on rollers 40, extends from the rear end of the conveyor belt 35, and constitutes a feeding means to the second ruling instrumentality 17.

In order to avoid complications and confusion the ruling means has not been shown in detail, but it will be understood that it consists of suitable pen beams illustrated diagrammatically at 41, and carrying pens 42 that operate on the sheets, as they pass over the bed 19.

A sheet feeder of the pile type is also diagrammatically illustrated and consists of a frame 43 carrying a vertically adjustable table 44, from which the sheets are fed by any suitable means to a delivery belt 45 overlying the frame extension 31 and delivering sheets in a well-known manner to the upper stretch 20 of the conveyor belt and the associated cords 25.

The second ruling instrumentality 17 includes a frame 46 suitably joined to the frame 18 by tie rods 47, or other desirable means. In this frame is located the usual bed 48, over which the ruling devices 49 are placed. It will be noted that the pens 49 and the pens 41 are correspondingly faced, that is, incline and operate in the same direction. The upper stretch 50 of a sheet conveyor belt or cloth operates over the bed 48, passing around a front roller 51, a rear roller 52, and suitable guide rollers 53. Endless cords 54 cooperate with the upper stretch 50 of the conveyor belt, and pass around suitable guide rollers 55 in a well known manner. The bed 48 and the ruling instrumentalities 49, it will be noted by a comparison of Figures 1 and 2, are located at a lower level than the first bed 19 and its instruments 41—42. The front ends of the cooperating stretches of the belt 50 and cords 54 are located adjacent to the rear end of the conveyor 39, so that sheets delivered thereby will be carried beneath the ruling pens 49, and thence delivered by the conveyor cords 56 and a lower conveyor 57 to a discharge point 58 where they may be received by a "lay-boy" in the usual manner (which lay-boy is not illustrated.)

Referring now particularly to the conveyor tapes 32 at the front end of the machine and the mechanism associated therewith, as shown more particularly in Figures 7, 8 and 9, the tapes 32 have overlying them a gate 59, consisting of a plate or strip, notched, as shown at 60 to receive the tapes, and fixed to a rock shaft 61, so that this gate may be swung between a vertical position across the path of movement of the sheets carried by said tapes, and a horizontal position where it will be out of such path of movement. The rock shaft is journaled on a pair of brackets 62 on the opposite sides of the machine, and said brackets constitute carriages that are slidable upon bars 63 fixed to the opposite sides of the frame. The rock shaft 61 is provided in one end with a pair of sockets 64 adapted to be engaged by a ball 65, slidably seated in one of the brackets 62, and having a spring 66 behind it. This ball constitutes means for holding the gate either in its vertical or horizontal position. Journaled in the brackets 62 is a roller 67, to one end of which is fixed a hand wheel 68. This roller also has fixed thereto sprocket wheels 69 that are in mesh with fixed sprocket chains 70 secured to the frame of the machine. It will thus be evident that by rotating the hand wheel 68 the wheels 69 will also be rotated and the chains 70 acting as racks, will cause the wheels to travel along them. This will also carry the gate and thus said gate may be moved to different positions along the tapes 32, and by turning the rock shaft 61, as already explained, the gate 59 can be either swung to a position across the path of the sheets carried on the upper stretches of the tapes 32, or to a position where it will not interfere with the passage of said sheets carried by the tapes.

Between the gate 59 and the rear end of the tapes 32, and located beneath said tapes is a suction roller 71, shown more particularly in Figure 6. This suction roller may be of any well-known type, but is preferably of the character disclosed in my Patent, No. 1,494,303, granted on May 13, 1924. It is carried on a suitable shaft 72 and has an adjustable connection with a suction pipe 73. From this pipe a hose 74 may extend to any suitable vacuum mechanism, and in the suction pipe thus provided is a suitable controlling valve 75. The valve, as illustrated in Figure 5 may be connected by a link 76 with an arm 77 operated on by a suitable cam 78. The mechanism, it is believed, is well-known to those skilled in the art.

For the purpose of putting tension on the belt or cloth 35, when the gate 59 is in its inoperative position, as shown in Figure 3, a removable roller 79 is employed, which can be mounted in suitable journal brackets 80 on the frame, and serves, as illustrated in Figure 3, to put tension not only on the belt 35, but also on the tapes 32. When the gate 59 is in its active position, as shown in Figure 1, this roller 79 is removed from the brackets 80, and is then suitably mounted, as shown in Figure 1 in suitable bearings, as 81, at a point to raise the upper stretch of the belt 35 into cooperating engagement with the lower front ends of the stretches of the cords 30.

Interposed between the rear end of the belt or cloth 35 and the front end of the conveyor 39 is a sheet-turning mechanism, which is indicated diagrammatically in Figures 1 and 3, and is shown in detail in Figures 11–15 inclusive. Extending across the frame are a pair of fixed slide rods 82, on which are slidably mounted sleeves 83, connected at their ends by standard brackets 84 that thus form a carriage. This carriage is adjusted by means of a screw shaft 84ª journaled in one of the brackets 84, and having a threaded adjustment with a fixed nut 84ᵇ. The screw shaft has a suitable operating handle 84ᶜ. Journaled in this carriage is a rotatable sheet-turning cone 85, the upper face of which is horizontal. The apex end of the cone is journaled, preferably by having an extension 86 engaged with a thrust bearing pin 87 that is adjustable through a mounting shaft 88 journaled in one of the brackets 84. The other or larger end of the cone has a spindle 89 slidably and rotatably journaled in a box 90 that is pivoted, as shown at 91, in the bracket 84. This spindle has a universal coupling 92 with the sleeve section 93 of an extensible and contractile shaft. The other section of said shaft consists of a stem 94 engaged on the sleeve section and suitably feathered thereto. The stem 94 is journaled in a box 95 on the side frame of the machine and projects beyond said side frame. On the projecting end are loosely journaled a pair of sprocket wheels, respectively designated 96 and 97. These sprocket wheels carry clutch members 98. An intermediate clutch member 99, feathered to the stem 94, is movable into engagement with either of the clutch members 98, so as to connect the sprocket wheels 96 and 97 to the stem.

Referring now to Figures 4 and 5, a suitable motor, indicated at 100, constitutes the driving means for the apparatus. This, through a suitable train of gearing 101, drives a sprocket wheel 102, from which extends a sprocket chain 103 to another sprocket wheel 104 on the instrumentality 17. The sprocket wheel 104 operates a train of gearing 105, including a changeable speed gear 106 that drives the mechanism of the instrumentality 17 in a manner well understood in the art. Another train of gearing 107 is operated by the gearing 105, and drives a sprocket wheel 108 that in turn operates a sprocket chain 109. This sprocket chain 109 drives, through other sprocket wheels 110, a second sprocket chain 111 that passes around, and therefore operates the sprocket wheel 96 of the driving shaft 93—94 for the turning cone 85. Through gearing 112 operated by the gearing 101, a sprocket chain 113 is driven, which in turn operates changeable speed gearing 114 for driving the instrumentality 16, and through a system of gears 115, a sprocket chain 116 is driven that operates the sprocket wheel 97 of the shaft 93—94.

It will be noted that the turning cone 85 is located beneath a plate 117 that is interposed between the conveyor belt 35 and the conveyor 39 and that said plate is slotted, as shown at 118, so that the cone will extend sufficiently therethrough to engage the sheets passing over the plate. In order to insure frictional contact of the sheets with the cone, rollers 119 are employed that are journaled on brackets 120 mounted on a rock shaft 121. These brackets are preferably adjustable along the rock shaft and are suitably fixed thereto by clamping screws or the like 122. By rotating the shaft 121 the rollers may be moved between a position in engagement with the portion of the cone that is uncovered by the slot 118, or can be swung over on to the rear end of the belt 35.

Referring particularly to Figures 1 and 2, the operation of the machine is substantially as follows: Sheets delivered by the conveyor 45 of the feeder will be carried by the cloth or belt 24 and associated cords 25 over the bed 19, and thus past the ruling pens 42 in the usual manner. The sheets are thence carried against the under side of the lower stretch 24 of the conveyor, forwardly on to the tapes 32. With the gate 59 in its active position, as indicated in Figure 1, the sheets will thus be brought successively against the gate 59, and thereupon the suction roller 71 operates to reverse them and carry them in opposition to the direction of movement of the tapes 32, whereupon their advanced ends will drop on to the upper stretch of the belt or cloth 35, and be carried between the adjacent rollers 30 and 79, moving them rearwardly, and obviously with their ruled faces down. Assuming that the rollers 119 are in coaction with the cone 85, as the sheets pass over the plate 117, they will be given an edgewise turn of 90 degrees and will be delivered on to the conveyor 39. They will be transported by this conveyor to the second ruling instrumentality 17 and passed through the same, so that the upper face will be ruled but the lines thereon will be at right angles to the lines on the under face which had been ruled by the first instrumentality 16. If, however, the rollers 119 are moved rearwardly, so that they are out of coaction with the cone and the cone is stopped by unclutching both sprocket wheels 96 and 97, then the sheets will pass the cone without being turned and their upper faces ruled in lines parallel to the lines on the lower faces. If, however, the gate 59, is swung to its horizontal or inactive position, as indicated in Figure 3 and the roller 79 is placed in the brackets 80 and the suction feed roll 71 is also caused to be inactive, the sheets will consequently be carried past the gate 59, as indicated in Figure 1, beneath the tapes 32, and upon the upper stretch of the belt 35. Their ruled faces will thus be brought uppermost again, and in this relation they are carried across the turning cone. The cone obviously may be either in operation or inactive, so that the sheets may be turned or not, as desired, and fed to the second instrumentality 17 where the same faces that were first ruled will again be subjected to ruling.

The turning cone is adjustably mounted in order that its apex or axis of rotation may be made coincident with the edge of the line of sheets, insuring a proper turning action, and inasmuch as sheets narrower in width than their length may be ruled, requiring the two instrumentalities 16 and 17 to be operated at relatively different speeds, the cone can be driven in accordance with the speed of either instrumentality, thus insuring a proper spacing of the sheets when turned.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In a ruling machine, the combination with two sets of correspondingly faced ruling mechanisms, of means for carrying sheets to be ruled in a predetermined direction past one of the mechanisms, means for carrying said sheets in the same general direction past the other mechanism, and means for reversing the sheet to cause the second ruling mechanism to operate on the opposite face to that operated on by the first mechanism.

2. In a ruling machine, the combination with two sets of correspondingly faced ruling mechanisms located one behind the other, of means for carrying sheets to be ruled past the first of the mechanisms, means for carrying said sheets past the second mechanism, and means for reversing the sheet to cause the second ruling mechanism to operate on the opposite face to that operated on by the first mechanism.

3. In a ruling machine, the combination with two sets of correspondingly faced ruling mechanisms located one behind the other, the second set being in a lower plane than the first set, of means for carrying sheets to be ruled in one direction past the first of the mechanisms, means for carrying said sheets in the same direction past the second mechanism, and means for reversing the sheet to cause the second ruling mechanism to operate on the opposite face to that operated on by the first mechanism.

4. In a ruling machine, the combination with two sets of correspondingly faced ruling mechanisms, located one behind the other, of means for carrying sheets to be ruled in a predetermined direction past the respective ruling mechanisms, and means for carrying the sheets in an opposite direction beneath the first ruling mechanism and thence delivering them to the second ruling mechanism.

5. In a ruling machine, the combination with two sets of correspondingly faced ruling mechanism located one behind the other, of means for carrying sheets to be ruled successively past the respective ruling mechanisms and in the same general direction, means for carrying the sheets in an opposite direction beneath the first ruling mechanism and thence delivering them to the second ruling mechanism, and means for altering the relation of the sheets between the passage from one ruling mechanism to the other to cause said sheets to be fed to the second ruling mechanism in a different relation from their delivery to the first ruling mechanism.

6. In a ruling machine, the combination with two sets of corresponding faced ruling mechanisms located in substantial line one behind the other, of means for conveying sheets to be ruled successively past the ruling mechanisms, and means beneath the first ruling mechanism for changing the relation of the sheets after passing the first ruling mechanism and before delivering to the second ruling mechanism.

7. In a ruling machine, the combination with two sets of correspondingly faced ruling mechanisms located in substantial line one behind the other, of means for conveying sheets to be ruled successively in one direction past the ruling mechanisms, and means for carrying the sheets in a reverse direction beneath the first ruling mechanism after being ruled thereby and thence delivering them rearwardly to the second ruling mechanism.

8. In a ruling machine, the combination with two sets of correspondingly faced ruling mechanisms located in substantial line, of means for conveying sheets to be ruled successively in one direction past the ruling mechanism, and means for carrying the sheets in a reverse direction beneath the first ruling mechanism after being ruled thereby, changing their relation, and thence delivering them rearwardly to the second ruling mechanism.

9. In a ruling machine, the combination with a ruling mechanism, of an endless belt for conveying sheets to be ruled past the ruling mechanism, means associated with the lower stretch of the belt for conveying the ruled sheets to the front portion of the belt, a second ruling mechanism, and means for reversing the travel of the ruled sheets at the front portion of the belt and delivering them to the second ruling mechanism.

10. In a ruling machine, the combination with a ruling mechanism, of an endless belt for conveying sheets to be ruled past the ruling mechanism, a conveyor cooperating with the lower forwardly moving stretch of the belt to convey the ruled sheets forwardly, mechanism at the front end of the belt for receiving the sheets and reversing their direction of travel, a second ruling mechanism behind the first ruling mechanism, and conveying means extending beneath the belt for receiving the sheets from the direction reversing mechanism and carrying them rearwardly to the second ruling mechanism.

11. In a ruling machine, the combination with a first ruling mechanism, of a second ruling mechanism, means for carrying sheets to be ruled past the first ruling mechanism, and mechanism for transmitting the sheets from the first ruling mechanism to the second ruling mechanism said mechanism including means for causing such transmission with the same face to be ruled by both mechanisms, and for also causing said transmitting mechanism to cause the sheets to be delivered to the second ruling mechanism with the faces opposite to those ruled by the first ruling mechanism, in position to be ruled by the second ruling mechanism.

12. In a ruling machine, the combination with a first ruling mechanism, of a second ruling mechanism, means for carrying sheets to be ruled past the first ruling mechanism, means for turning the sheets ruled by the first mechanism upside down and thereafter again turning them ruled side up, means for delivering the ruled sheets from said turning means to the second ruling mechanism, and means for preventing the operation of the turning means to reinvert the sheets ruled side up and delivering the said sheets upside down to said delivery means.

13. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, and means for causing said second conveyor to be inactive to reinvert the sheets, said last mentioned means delivering the sheets upside down to the delivering conveyor of the second ruling mechanism.

14. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, a stop movable into and out of coaction with said second conveyor to stop the sheets carried thereby, and means for changing the direction of the sheets so stopped and delivering them to the conveyor for the second ruling mechanism.

15. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, a stop movable into and out of coaction with said second conveyor to stop the sheets carried thereby, and a suction roller for reversing the direction of movement of the sheets so stopped and delivering them to the conveyor that directs said sheets to the second ruling mechanism.

16. In a ruling machine, the combination with two ruling mechanisms located one behind the other, of an endless belt having an upper stretch for carrying the sheets past the first ruling mechanism and a lower stretch, conveying means coacting with the lower stretch for reversing the sheets and carrying them forwardly, conveyor means at the front portion of the belt for receiving the sheets and reinverting them, a stop for the sheets movable into and out of coaction with the reinverting conveyor, means to prevent its reinverting action, a device for changing the direction of the sheets stopped by said stop, and means for carrying the sheets from said reinverting conveying means and from said direction changing means to the second ruling mechanism.

17. In a ruling machine, the combination with two ruling mechanisms located one behind the other, of an endless belt having an upper stretch for carrying the sheets past the first ruling mechanism and a lower stretch, conveying means coacting with the lower stretch for reversing the sheets and carrying them forwardly, conveyor means at the front portion of the belt for receiving the sheets and reinverting them, a stop for the sheets movable into and out of coaction with the reinverting conveyor means to prevent its reinverting action, a suction roller for changing the direction of the sheets stopped by said stop, and means for carrying the sheets from said reinverting conveying means and from said suction roller to the second ruling mechanism.

18. In a ruling machine, the combination with two sets of ruling mechanisms, located one behind the other, of means for carrying sheets to be ruled past the respective ruling mechanisms, means for carrying the sheets beneath the first ruling mechanism and thence delivering them to the second ruling mechanism, and means for swinging said sheets edgewise to cause the second ruling mechanism to rule lines transverse to the first set.

19. In a ruling machine, the combination with two sets of ruling mechanisms, of means for carrying sheets to be ruled past one of the mechanisms, means for carrying said sheets past the other mechanism, means for reversing the sheet to cause the second ruling mechanism to operate on the opposite face to that operated on by the first mechanism, and means for swinging said sheets edgewise to cause the second ruling mechanism to rule lines transverse to the first set.

20. In a ruling machine, the combination with two sets of ruling mechanisms located one behind the other, of means for carrying sheets to be ruled past the first of the mechanisms, means for carrying said sheets past the second mechanism, means for reversing the sheet to cause the second ruling mechanism to operate on the opposite face to that operated on by the first mechanism, and means for swinging said sheets edgewise to cause the second ruling mechanism to rule lines transverse to the first set.

21. In a ruling machine, the combination with two sets of ruling mechanisms located one behind the other, the second set being in a lower plane than the first set, of means for carrying sheets to be ruled past the first of the mechanisms, means for carrying said sheets past the second mechanism, means for reversing the sheets to cause the second ruling mechanism to operate on the opposite face to that operated on by the first mechanism, and means for swinging said sheets edgewise to cause the second ruling mechanism to rule lines transverse to the first set.

22. In a ruling machine, the combination with a ruling mechanism, of an endless belt for conveying sheets to be ruled past the ruling mechanism, means associated with the lower stretch of the belt for conveying the ruled sheets to the front portion of the belt, a second ruling mechanism, means for reversing the travel of the ruled sheets at the front portion of the belt and delivering them to the second ruling mechanism, and means for swinging said sheets edgewise to cause the second ruling mechanism to rule lines transverse to the first set.

23. In a ruling machine, the combination with a ruling mechanism, of an endless belt for conveying sheets to be ruled past the ruling mechanism, a conveyor cooperating with the lower forwardly moving stretch of the belt to convey the ruled sheets forwardly, mechanism at the front end of the belt for receiving the sheets and reversing their direction of travel, a second ruling mechanism behind the first ruling mechanism, conveying means extending beneath the belt for receiving the sheets from the direction reversing mechanism and carrying them rearwardly to the second ruling mechanism, and means for swinging said sheets edgewise to cause the second ruling mechanism to rule lines transverse to the first set.

24. In a ruling machine, the combination with a first ruling mechanism, of a second ruling mechanism, means for carrying sheets to be ruled past the first ruling mechanism, and mechanism for transmitting the sheets from the first ruling mechanism to the second ruling mechanism, said mechanism including means for making such transmission, with the same face to be ruled by both mechanisms, and for also causing the sheets to be delivered to the second ruling mechanism with the faces opposite to those ruled by the first ruling mechanism in position to be ruled by the second ruling mechanism, and means for swinging said sheets edgewise to cause the second ruling mechanism to rule lines transverse to the first set.

25. In a ruling machine, the combination with a first ruling mechanism, of a second ruling mechanism, means for carrying sheets to be ruled past the first ruling mechanism, means for turning the sheets ruled by the first mechanism upside down and thereafter again turning the ruled side up, means for delivering the ruled sheets from said turning means to the second ruling mechanism, means for preventing the operation of the turning means to reinvert the sheets ruled side up and delivering the said sheets upside down to said delivery means, and means for swinging said sheets edgewise to cause the second ruling mechanism to rule lines transverse to the first set.

26. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, means for causing said second conveyor to be inactive to reinvert the sheets, said last mentioned means delivering the sheets upside down to the delivering conveyor of the second ruling mechanism, and means for swinging said sheets edgewise to cause the second ruling mechanism to rule lines transverse to the first set.

27. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, a stop movable into and out of coaction with said second conveyor to stop the sheets carried thereby, means for changing the direction of movement of the sheets so stopped and delivering them to the conveyor for the second ruling mechanism, and means for swinging said sheets edgewise to cause the second ruling mechanism to rule lines transverse to the first set.

28. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, a stop movable into and out of coaction with said second conveyor to stop the sheets carried thereby, a suction roller for reversing the direction of movement of the sheets so stopped and delivering them to the conveyor that directs said sheets to the second ruling mechanism, and means for swinging said sheets edgewise to cause the second ruling mechanism to rule liens transverse to the first set.

29. In a ruling machine, the combination with two ruling mechanisms located one behind the other, of an endless belt having an upper stretch for carrying the sheets past the first ruling mechanism and a lower stretch, conveying means coacting with the lower stretch for reversing the sheets and carrying them forwardly, conveyor means at the front portion of the belt for receiving the sheets and reinverting them, a stop for the sheets movable into and out of coaction with the reinverting conveyor means to prevent its reinverting action, a device for changing the direction of movement of the sheets stopped by said stop, means for carrying the sheets from said reinverting conveyor means and from said direction changing means to the second ruling mechanism, and means for swinging said sheets edgewise to cause the second ruling mechanism to rule lines transverse to the first set.

30. In a ruling machine, the combination with two sets of ruling mechanisms located one behind the other, of means for carrying sheets to be ruled past the respective ruling mechanisms, means for carrying the sheets beneath the first ruling mechanism and thence delivering them to the second ruling mechanism, a conical roller member beneath the first ruling mechanism and over which the sheets pass, and means movable into and out of coaction with the roller member and when in coaction causing the sheets to be swung edgewise during their travel to the second ruling mechanism.

31. In a ruling machine, the combination with a ruling mechanism, of an endless belt for conveying sheets to be ruled past the ruling mechanism, means associated with the lower stretch of the belt for conveying the ruled sheets to the front portion of the belt, a second ruling mechanism, means for reversing the travel of the ruled sheets at the front portion of the belt and delivering them to the second ruling mechanism, a conical roller member across which the sheets pass, and means that coacts with the roller for causing it to swing the sheets edgewise during the travel to the second ruling mechanism.

32. In a ruling machine, the combination with a ruling mechanism, of an endless belt for conveying sheets to be ruled past the ruling mechanism, a conveyor cooperating with the lower forwardly moving stretch of the belt to convey the ruled sheets forwardly, mechanism at the front end of the belt for receiving the sheets and reversing their direction of travel, a second ruling mechanism behind the first ruling mechanism, conveying means extending beneath the belt for receiving the sheets from the direction reversing mechanism and carrying them rearwardly to the second ruling mechanism, a conical roller member across which the sheets pass, and means that coacts with the roller for causing it to swing the sheets edgewise during their travel to the second ruling mechanism.

33. In a ruling machine, the combination with a first ruling mechanism, of a second ruling mechanism, means for carrying sheets to be ruled past the first ruling mechanism, means for turning the sheets ruled by the first mechanism upside down and means for thereafter again turning them ruled side up, means for delivering the ruled sheets from said turning means to the second ruling mechanism, means for preventing the operation of the turning means to reinvert the sheets ruled side up and delivering the said sheets upside down to the said delivery means, and means for causing the sheets to be swung edgewise prior to their delivery to the second ruling mechanism, said last mentioned means being movable to an operative or inoperative condition.

34. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, a stop movable into and out of coaction with said second conveyor to stop the sheets carried thereby, means for changing the direction of the sheets so stopped and delivering them to the conveyor for the second ruling mechanism, a conical roller member interposed between said second conveyor and the conveyor for directing the sheets to the second ruling mechanism, and means for causing said roller member to swing the sheets edgewise.

35. In a ruling machine, the combination with a first ruling mechanism, of a second ruling mechanism, means for carrying sheets to be ruled past the first ruling mechanism, a conveyor coacting with the carrying means for turning the ruled sheets upside down, a second conveyor for receiving the ruled sheets and reinverting them to place the ruled side up, a conveyor for directing the ruled sheets to the second ruling mechanism, a stop movable into and out of coaction with said second conveyor to stop the sheets carried thereby, a suction roller for reversing the direction of movement of the sheets so stopped and delivering them to the conveyor that directs said sheets to the second ruling mechanism, a conical roller member interposed between the suction roller and the conveyor of the second ruling mechanism, and means for causing the sheets to be swung edgewise by the conical roller member as they pass the same.

36. In a ruling machine, the combination with a first ruling mechanism, of a second ruling mechanism behind and in substantial line with the first, an endless belt having an upper stretch for carrying sheets rearwardly past the first ruling mechanism and having a lower forwardly moving stretch, endless supports coacting with the lower stretch for inverting and carrying the ruled sheets forwardly beneath the first ruling mechanism, a second endless belt receiving the forwardly moving sheets, means coacting with the second endless belt for reinverting the sheets and moving them rearwardly, a stop movable into a position on the second endless belt for stopping the sheets thereon, and preventing them being reinverted, a third endless feeding belt for carrying the sheets to the second ruling mechanism, and means for delivering to the third belt the sheets from the stop or the second belt after being reinverted.

37. In a ruling machine, the combination with a first ruling mechanism, of a second ruling mechanism behind and in substantial line with the first, an endless belt having an upper stretch for carrying sheets rearwardly past the first ruling mechanism and having a lower forwardly moving stretch, endless supports coacting with the lower stretch for inverting and carrying the ruled sheets forwardly beneath the first ruling mechanism, a second endless belt receiving the forwardly moving sheets, means coacting with the second endless belt for reinverting the sheets and moving them rearwardly, a stop movable into a position on the second endless belt for stopping the sheets thereon and preventing them being reinverted, a third endless feeding belt for carrying the sheets to the second ruling mechanism, a suction roller for reversing the direction of the sheets and delivering them toward the third belt, a conical roller interposed between the second and third belts and over which the sheets pass to said third belt, and means movable into coaction with the conical roller to cause the roller to swing the sheets edgewise as they pass to the third belt.

38. In a ruling machine, the combination with two correspondingly sets of ruling mechanisms located one behind the other, of conveyors located one behind the other for carrying sheets to be ruled past the respective ruling mechanisms, means for moving the conveyors longitudinally in the same direction, and means interposed between said feeding means for turning the sheets edgewise to cause the lines ruled by the second mechanism to be transverse to those ruled by the first mechanism.

39. In a ruling machine, the combination with two sets of ruling mechanisms located one behind the other, of means for carrying sheets to be ruled past the respective ruling mechanisms, a substantially conical roller member interposed between said feeding means and across which the sheets pass, and means cooperating with the roller member to cause the sheets to be turned edgewise thereby before their delivery to the second ruling mechanism.

40. In a ruling machine, the combination with two sets of ruling mechanisms, of means for causing sheets to successively traverse the same, a conical roller member traversed by the sheets, means coacting with the rollers for causing the latter to swing the sheets edgewise as they traverse it, and means for shifting the roller transversely to the path of the sheets.

41. In a ruling machine, the combination with two sets of ruling mechanisms, of means for causing sheets to successively traverse the same, a conical roller member traversed by the sheets, means coacting with the rollers for causing the latter to swing the sheets edgewise as they traverse it, an extensible and contractile driving shaft for the roller, and means for adjusting the roller longitudinally of itself and transversely to the path of the sheets.

42. In a ruling machine, the combination with two sets of ruling mechanisms, of means for causing sheets to successively traverse the same, a conical roller member traversed by the sheets, means coacting with the rollers for causing the latter to swing the sheets edgewise as they traverse it, supporting rods extending transversely of the path of the sheets, a carriage slidable on said rods and having the roller journaled thereon, means for shifting the carriage, and an adjustable driving means for the roller.

43. In a ruling machine, the combination with two sets of ruling mechanisms, of means for causing sheets to pass from one to the other, means between the sets for swinging the sheets edgewise to cause one set to rule lines transverse to those ruled by the other set, a sheet conveyor for each ruling mechanism, means for operating the conveyors at different rates of speed, and means for driving the sheet swinging means in accordance with the rate of speed of either conveyor.

44. In a ruling machine, the combination with two sets of ruling mechanisms, of means for causing sheets to pass from one to the other, means between the sets for swinging the sheets edgewise to cause one set to rule lines transversely to those ruled by the other set, a sheet conveyor for each ruling mechanism, gearing for operating the conveyors at different rates of speed, separate driven clutch members operated by the gearing of the different conveyors, and means for clutching either member to the sheet swinging means.

45. In a ruling machine, the combination with two sets of ruling mechanisms, of a conveyor for moving the sheets past the same, means for transferring the sheets from one mechanism to the other, a conical roller member across which the sheets pass in said transferring movement, means that coact with the roller member for causing the latter to swing the sheets edgewise, differential gearings for driving the respective conveyors at relatively different speeds, clutch members respectively driven from the gearings, and means for clutching either member to the roller member.

46. In a ruling machine, the combination with a first and a second ruling mechanism, of means for transferring sheets from one to the other including an endless conveyor, and means coacting therewith to reverse the sheets, a stop movable into coaction with the conveyor to prevent the reversal movement, means for removing the sheets that engage the stop, and means for mounting the stop and permitting its adjustment to different points along the conveyor.

47. In a ruling machine, the combination with a first and a second ruling mechanism, of means for transferring sheets from one to the other, including an endless conveyor and means coacting therewith to reverse the sheet, supporting rods located longitudinally of the conveyor, a carriage slidable on the rods, a stop pivoted on the carriage and movable into and out of coaction with the conveyor and movable with the carriage to different positions along the conveyor, and means for removing the sheets that engage the stop.

48. In a ruling machine, the combination with a first and a second ruling mechanism, of means for transferring sheets from one to the other, including an endless conveyor and means coacting therewith to reverse the sheets, supporting rods located longitudinally of the conveyor, a carriage slidable on the rods, a stop pivoted on the carriage and movable into and out of coaction with the conveyor and movable with the carriage to different positions along the conveyor, fixed sprocket chains along the rods, a shaft journaled on the carriage and having sprocket wheels engaged with the chains, and means for removing the sheets that engage the stop.

49. In a ruling machine, the combination with two ruling instrumentalities including means for moving sheets therethrough at relatively different rates of speed, of a sheet turning device interposed between them, and means for moving the turning device at a speed synchronous to that of the speed of either instrumentality.

50. In a ruling machine, the combination with a first and a second frame, each having front and rear ends, of ruling devices mounted on each frame, conveyors in each frame for carrying sheets rearwardly of said frames past the ruling devices thereof, and means mounted in the first frame for changing the relation of the sheets, means for carrying the sheets after ruling forwardly of the first frame and delivering them to the relation changing means, and means for moving the sheets rearwardly from the relation changing means and delivering them to the conveyor of the second machine.

In testimony whereof, I affix my signature.

ALBERT BROADMEYER.